| Drive Range | Torque Ratios |
|---|---|
| 1 | $\left(1+\dfrac{R_1}{S_1}\right)\left(1+\dfrac{S_2}{R_2}\right)$ |
| 2 | $\left(1+\dfrac{R_1}{S_1}\right)\left(1+\dfrac{S_2}{R_2}\right)-\dfrac{R_1}{S_1}$ |
| 3 | $\left(1+\dfrac{S_2}{R_2}\right)$ |
| 4 | 1 |
| Rev. | $-\left(\dfrac{R_1}{S_1}\right)\left(1+\dfrac{R_2}{S_2}\right)$ |

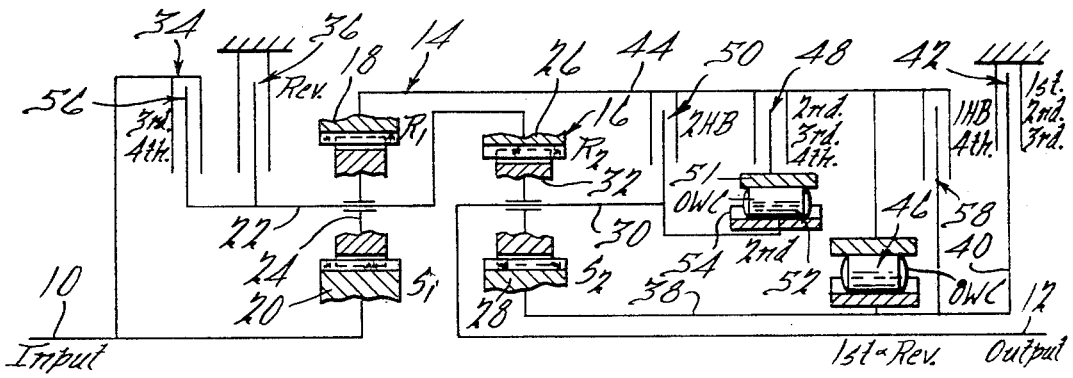

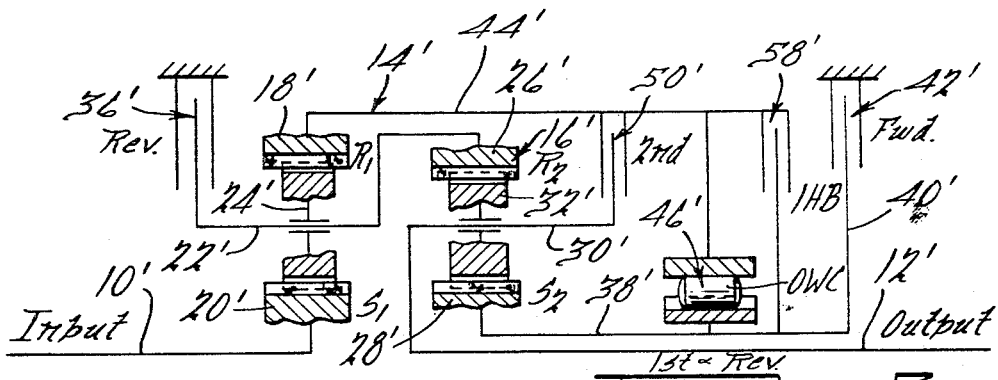

FIG. 3.

| Drive Range | Torque Ratios |
|---|---|
| 1 | $\left(1+\dfrac{R_1}{S_1}\right)\left(1+\dfrac{S_2}{R_2}\right)$ |
| 2 | $\left(1+\dfrac{R_1}{S_1}\right)\left(1+\dfrac{S_2}{R_2}\right)-\dfrac{R_1}{S_1}$ |
| Rev. (Lo) | $-\left(\dfrac{R_1}{S_1}\right)\left(1+\dfrac{R_2}{S_2}\right)$ |
| Rev. (Hi) | $-\dfrac{R_1}{S_1}$ |

FIG. 4.

INVENTOR:
Larry A. Kepner
BY
ATTORNEYS

United States Patent Office 3,473,415
Patented Oct. 21, 1969

3,473,415
MULTIPLE RATIO POWER TRANSMISSION
MECHANISM WITH TWO SIMPLE PLANE-
TARY GEAR UNITS
Larry A. Kepner, Dearborn, Mich., assignor to Ford
Motor Company, Dearborn, Mich., a corporation
of Delaware
Filed Apr. 11, 1968, Ser. No. 720,605
Int. Cl. F16h 57/10
U.S. Cl. 74—759                                       6 Claims

ABSTRACT OF THE DISCLOSURE

A multiple ratio gear system for use in the driveline of an automotive vehicle comprising two simple planetary gear units and friction clutch-and-brake means for controlling the relative motion of the gear elements to initiate speed ratio changes, wherein a minimum number of friction members is needed to effect ratio control without the necessity for establishing synchronism or timed engagement and release of the friction member.

PARTICULAR DESCRIPTION OF
THE INVENTION

My invention is adapted especially to be used in the driveline of an automotive vehicle for delivering torque from an engine-driven output member to a vehicle driveshaft. In a preferred embodiment of my invention I have provided two simple planetary gear units that are capable of establishing four forward-driving speed ratios and a single reverse speed-ratio with optimum ratio steps from the lowest speed ratio to the highest speed ratio, the latter being a direct-drive ratio.

The relative motion of the gear elements of the two simple planetary gear units is controlled by friction clutch and brake members that can be applied and released to establish the various ratio shifts. Only a single reaction friction brake is applied during low speed ratio operation. A non-synchronous ratio change from the low speed ratio to the second speed ratio is achieved simply by enaging a single friction clutch as the first friction brake remains applied to provide a torque reaction point for a gear element that is common for each of the first three speed ratio conditions. The ratio change from the second speed ratio to the third speed ratio also is non-synchronous as a second friction clutch is applied while the previously applied friction clutch remains applied. The establishment of any one of the first three forward driving speed ratios thus requires only the engagement of a single friction element.

An upshift from the third speed ratio to the direct-drive, high speed ratio is achieved by releasing the brake that anchors the reaction element for the gear units during underdrive operation and applying a third clutch that estabishes a lock-up condition in the gear units as the other two friction clutches remain applied.

During operation in the second speed ratio, a regenerative torque delivery path is established in the gear units with the carrier of one unit overspreading the ring gear of the other unit as the carrier of the other unit drives the ring gear of the one unit.

BRIEF DESCRIPTION OF THE FIGURES
OF THE DRAWING

FIGURE 1 shows in schematic form an assembly of the gear elements and the clutches and brakes of the transmission mechanism of my invention.

FIGURE 2 is a chart showing the clutch and brake engagement and release pattern, together with typical speed ratio values for the embodiment of FIGURE 1.

FIGURE 3 is a sketch of a two-speed ratio transmission embodying some of the characteristics of the FIGURE 1 embodiment.

FIGURE 4 is a chart showing the clutch engagement and release pattern for the FIGURE 3 embodiment, together with typical speed ratios.

PARTICULAR DESCRIPTION OF THE
INVENTION

In FIGURE 1, numeral 10 designates a power input shaft for the transmission mechanism. This may be the turbine shaft of a hydrokinetic torque converter, the impeller of which is connected to the internal combustion vehicle engine. Numeral 12 designates the power output shaft, which may be journalled in known fashion in the housing for the transmission structure, which housing can be bolted to the engine block of the vehicle engine. The shaft 12 can be connected to the driveshaft of the driveline, which in turn is connected to the traction wheel axle shafts through a differential gear mechanism.

The embodiment of FIGURE 1 includes two simple planetary gear units identified at 14 and 16. Gear unit 14 includes ring gear 18, sun gear 20, planetary carrier 22, and planetary pinions 24 journalled on the carrier 22. Pinions 24 mesh with ring gear 18 and sun gear 20. Carrier 22 is connected drivably to ring gear 26 of the gear unit 16. This gear unit includes also sun gear 28, carrier 30 and planet pinions 32. Pinions 32 are journalled on the carrier 30 and they mesh with the sun gear 28 and the ring gear 26. Carrier 30 is connected drivably to power output shaft 12.

Shaft 10 is adapted to be connected selectively to carrier 22 through friction clutch 34. This clutch is applied during operation in the third speed ratio and the fourth speed ratio, the latter being a direct drive ratio.

Carrier 22 is anchored during reverse drive operation by a reverse drive friction brake 36 which distributes torque reaction from the carrier 22 to the transmission housing when it is applied.

Sun gear 28 acts as the reaction element for the gear system during operation in the first, second and third speed ratios. It is connected to sun gear shaft 38, which is in the form of a sleeve surrounding power output shaft 12. Shaft 38 is connected to brake element 40 which can be anchored to the transmission housing during operation in the first, second and third speed ratios by a friction brake 42.

During first speed ratio operation, torque acting on the ring gear 18 is distributed through a torque transfer drum 44 which surrounds gear unit 16. Drum 44 is connected driveably to sleeve shaft 38 during operation in the first speed ratio and reverse drive ratio by overrunning coupling 46. Torque reaction is distributed from the ring gear 18 through the coupling 46 to the anchored sleeve shaft 38 in one direction during the first speed ratio and reverse drive operation, but coupling 46 is incapable of accommodating torque reaction in the opposite direction. It is possible, therefore, for the ring gear 18 to overspeed the shaft 38 on an upshift from the lowest speed ratio.

To effect such an upshift from the first speed ratio to the second speed ratio, it merely is necessary to apply friction clutch 48. This connects the outer race 51 of an overrunning coupling 52 to the drum 44. The inner race 54 for the coupling 52 is connected to the carrier 30. Thus the carrier 30 is adapted to deliver torque through the coupling 52 and the friction clutch 48 to the drum 44 to overspeed the ring gear 18 during second speed ratio operation. If hill braking in the second speed ratio is desired, another friction clutch can be used to connect drivably the drum 44 and the carrier 30. This clutch is shown at 50. Clutch 50 is capable of accommodating torque delivery in either direction between the carrier 30 and the drum 44. During the normal acceleration period, however, clutch 50 would be applied.

To effect the speed ratio change to the third speed ratio, it merely is necessary to apply third speed ratio friction clutch 56 which connects drivably the input shaft 10 to the carrier 22. Engagement and release of the other friction clutches and brakes is not required. Overrunning coupling 52 freewheels as soon as the clutch 56 is applied. Sun gear 28 again serves as a reaction member since it is anchored by the brake 42. Overrunning coupling 46 freewheels during third speed ratio operation as well as second speed ratio operation.

To effect a speed ratio change to the fourth speed ratio from the third speed ratio, it merely is necessary to apply friction clutch 58 which connects drivably drum 44 with the sun gear sleeve shaft 38. At the same time brake 42 is released to permit sun gear 28 to be driven. All of the elements of the gear units now are connected together for rotation in unison thereby establishing a 1:1 drive ratio between shaft 10 and shaft 12.

In summary, first speed ratio is obtained by applying brake 42. Sun gear 20 acts as a power input element. Ring gear 18 is held against rotation by the overrunning coupling 46. Carrier 22, which is driven by the sun gear 20, drives ring gear 26. Thus the carrier 30, with the sun gear 28 acting as a reaction element for the gear unit 16, drives the output shaft 12 at a ratio that is determined by the calculated ratios indicated in FIGURE 2.

Second speed ratio is obtained by applying clutch 48 as brake 42 remains applied. The forward motion of the carrier 30 now is transferred through the overrunning coupling 52 through the drum 44. This overspeeds ring gear 18 thereby driving the carrier 22 at a faster speed for any given speed of the shaft 10. With the ring gear 26 now being driven with a feedback torque transferred through the gear unit 14, the effective output speed of the carrier 30 and the shaft 12 is increased relative to the speed of shaft 10.

Third speed ratio is accomplished simply by locking up the gear unit 14. This is done by engaging clutch 34. Ring gear 26 now becomes the power input element and overrunning coupling 52 freewheels. All of the torque multiplication occurs in gear unit 16 with the sun gear 28 again acting as a reaction member.

A locked-up condition is established for fourth speed ratio operation by releasing the brake 42 and applying the clutch 58. All of the elements of the gear units now are connected together for rotation in unison.

Reverse drive operation is achieved by engaging brake 36 which anchors the carrier 22. All of the other friction elements are released. With the carrier 22 now acting as a reaction element, sun gear 20 drives ring gear 18 in a reverse direction. This reverse motion is transferred through the overrunning coupling 46 to the sun gear sleeve shaft 38. Since the carrier 22 is connected to the ring gear 26, ring gear 26 also acts as a reaction element for the gear unit 16 as torque is delivered to the gear unit 16 by the sun gear 28. Carrier 30 is driven in a reverse direction due to the reverse motion of sun gear 28.

In FIGURE 3 I have illustrated a transmission having features common to the FIGURE 1 embodiment although it is capable of producing only two speed ratios. In doing this I have eliminated counterparts for the clutch 34, clutch 48 and the overrunning coupling 52. The elements of FIGURE 3 that are common to the FIGURE 1 construction have been illustrated by similar reference characters although prime notations have been added.

In the FIGURE 3 embodiment, brake 42' is anchored during operation in each of the two forward driving speed ratios. To effect a speed ratio change to the second speed ratio, it merely is necessary to engage clutch 50', which again establishes a regenerative torque delivery path through the gear units in the manner previously described.

FIGURE 4 illustrates the clutch-and-brake engagement and release pattern for the FIGURE 3 construction. It is possible in the FIGURE 2 construction, as well as in the FIGURE 4 construction, to provide two reverse drive ratios. One of the ratios has been described previously. The other ratio can be obtained by engaging the clutch 50 in the case of FIGURE 1 or the clutch 50' in the case of FIGURE 3. In the latter case the reverse motion of the ring gear 18' is distributed through clutch 50' directly to the carrier 30' and hence to the output shaft 12'. The gear unit 16' does not serve to multiply torque. If a greater torque multiplication is desired during reverse drive operation, the clutches 50 or 50' remains disengaged thereby enabling the couplings 46 or 46' to transfer driving torque from drub 44 or 44', respectively, to the sun gears 28 or 28'.

Having thus described preferred embodiments of my invention, what I claim and desire to secure by U.S. Letters Patent is:

1. A planetary gear power transmission mechanism adapted to deliver driving torque from a power input shaft to a driven shaft comprising two simple planetary gear units, each gear unit including a ring gear, a sun gear, a carrier and planet pinions mounted on said carrier in meshing engagement with said sun and ring gears, the sun gear of the first of said gear units being connected to said power input shaft, the carrier of the second gear unit being connected to said driven shaft, first coupling means for connecting the ring gear of said first unit to the sun gear of said second unit during low speed ratio operation and during reverse drive operation, second coupling means for connecting the ring gear of said first gear unit to the carrier or said second gear unit during second speed ratio operation, clutch means for connecting together two torque transmitting elements of said first gear unit during third speed ratio operation, brake means for anchoring said sun gear of said second gear unit during operation in first, second and third speed ratios, friction clutch means for connecting together the ring gear of said first gear unit and the gun gear of said second gear unit as the first clutch means remains applied thereby establishing a direct-drive, fourth speed ratio operation, and brake means for anchoring the carrier of said first gear unit as the ring gear of said first gear unit drives the sun gear of said second gear unit in a reverse driving direction relative to the direction of motion of said power input shaft.

2. The combination as set forth in claim 1 wherein said first coupling means comprises an overrunning coupling having an inner race connected to the sun gear of said second gear unit and an outer race connected to the ring gear of said first gear unit, and overrunning coupling elements situated between said races, said second coupling means comprising a second overrunning coupling having an inner race connected to the carrier of said second gear unit, an outer race for said second coupling means, and friction clutch means for connecting said last-named outer race to said ring gear of said first gear unit.

3. The combination as set forth in claim 1 wherein said second coupling means include a friction clutch means for connecting drivably the ring gear of said first gear unit and the carrier of said second gear unit for torque delivery therebetween in either direction during acceleration and during hill braking operation in the second speed ratio, and a second friction clutch means for connecting drivably the sun gear of said second gear unit and the ring gear of said first gear unit to establish torque delivery therebetween in either direction during acceleration and during hill braking operation in the first speed ratio, said last-named clutch means being common to the clutch means for establishing fourth speed ratio operation.

4. The combination as set forth in claim 2 wherein said second coupling means include a friction clutch means for connecing drivably the ring gear of said first gear unit and the carrier of said second gear unit for torque delivery therebetween in either direction during acceleration and during hill braking operation in the second speed ratio, and a second friction clutch means for connecting drivably the sun gear of said second gear unit and the ring gear of said first gear unit to establish torque delivery therebetween in either direction during acceleration and during hill braking operation in the first speed ratio, said last-named clutch means being common to the clutch means for establishing fourth speed ratio operation.

5. A power transmission mechanism for delivering torque from a driving shaft to a driven shaft comprising two simple planetary gear units, each gear unit comprising a ring gear, a sun gear, a carrier and plant pinions mounted on said carrier in meshing engagement with said sun and ring gears, the input shaft being connected to the sun gear of a first of said gear units, the output shaft being connected to the carrier of a second of said gear units, overrunning coupling means for connecting drivably the ring gear of said first gear unit and the sungear of said second gear unit whereby torque is delivered from the former to the latter in one direction, clutch means for connecting the ring gear of said first gear unit and the carrier of said second gear unit during second speed ratio operation, the sun gear of said second gear unit acting as a reaction element during operation in each of two underdrive speed ratios, friction brake means for anchoring said sun gear of said second gear unit, and reverse brake means for anchoring the carrier of said first gear unit during reverse drive operation.

6. The combination as set forth in claim 5 wherein said clutch means for establishing second speed ratio operation is adapted to connect the ring gear of said first gear unit and the carrier of said second gear unit during reverse drive operation to establish a reverse torque delivery path of reduced torque multiplication.

References Cited
UNITED STATES PATENTS

| | | | |
|---|---|---|---|
| 1,581,695 | 4/1926 | Starr | 74—765 |
| 2,890,601 | 6/1959 | Forster | 74—759 X |
| 2,917,951 | 12/1959 | Aschauer | 74—759 X |

FOREIGN PATENTS

| | | |
|---|---|---|
| 233,242 | 4/1961 | Australia. |

ARTHUR T. McKEON, Primary Examiner